(12) United States Patent
Mitchell et al.

(10) Patent No.: US 10,707,918 B1
(45) Date of Patent: Jul. 7, 2020

(54) BROADBAND OVER POWER LINE NETWORK SYSTEMS FOR OFF-BOARD COMMUNICATION IN AIRCRAFT AND METHODS OF OPERATING THEREOF

(71) Applicant: The Boeing Company, Chicago, IL (US)

(72) Inventors: Timothy M. Mitchell, Seattle, WA (US); Tuan A. Nguyen, Kent, WA (US); David S. Mier, Mercer Island, WA (US); Tri M. Phan, Renton, WA (US); Anil Kumar, Sammamish, WA (US); Robert M. Kelly, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/377,728

(22) Filed: Apr. 8, 2019

(51) Int. Cl.
    *H04B 3/54* (2006.01)
(52) U.S. Cl.
    CPC ................................ *H04B 3/542* (2013.01)
(58) Field of Classification Search
    CPC .................................................. H04B 3/542
    USPC .......................................... 375/257; 340/531
    See application file for complete search history.

(56) References Cited

U.S. PATENT DOCUMENTS

| | | |
|---|---|---|
| 6,995,658 B2 | 2/2006 | Tustison et al. |
| 7,893,557 B2 | 2/2011 | Davis et al. |
| 8,483,656 B2 * | 7/2013 | Black ............... H04B 3/54 340/531 |
| 8,929,465 B2 | 1/2015 | Lee et al. |
| 8,942,865 B2 | 1/2015 | Kumar et al. |
| 8,948,934 B2 | 2/2015 | Lee et al. |
| 9,100,104 B2 | 8/2015 | Nguyen et al. |
| 9,295,032 B2 | 3/2016 | Kumar et al. |
| 9,350,423 B2 | 5/2016 | Mitchell et al. |
| 9,425,859 B2 | 8/2016 | Mitchell et al. |
| 9,436,569 B2 | 9/2016 | Lee et al. |
| 9,515,700 B2 | 12/2016 | Sampigethaya et al. |
| 9,667,316 B2 | 5/2017 | Nguyen et al. |
| 9,930,529 B2 | 3/2018 | Mitchell |
| 2014/0254693 A1 | 9/2014 | Mitchell et al. |

(Continued)

*Primary Examiner* — Fitwi Y Hailegiorgis
(74) *Attorney, Agent, or Firm* — Kwan & Olynick LLP

(57) ABSTRACT

Provided are methods and systems for on-ground communication using an electrical power distribution system of an aircraft. Specifically, two broadband over power line (BPL) communication modules are communicatively coupled to an electrical power distribution system of an aircraft at different locations. A communication-initiation request is transmitted between these modules and, in some examples, is used to establish communication between the modules. In more specific examples, the receiving module determines received parameters of the communication-initiation request, which depend, at least in part, on characteristics of the electrical power distribution system. The received parameters are compared with expected parameters, and an operating indication of the electrical power distribution system is generated based on this comparison. In some examples, the operating indication is used to verify configuration of the electrical power distribution system (e.g., during aircraft assembly), service requirements (e.g., during aircraft operation), and the like.

20 Claims, 6 Drawing Sheets

(56) References Cited

U.S. PATENT DOCUMENTS

2014/0312682 A1  10/2014 Lee et al.
2019/0122031 A1* 4/2019 Eriksson ............ G06K 9/00288

* cited by examiner

BROADBAND OVER POWER LINE NETWORK SYSTEMS FOR OFF-BOARD COMMUNICATION IN AIRCRAFT AND METHODS OF OPERATING THEREOF

BACKGROUND

Various operations, associated with manufacturing, service, and maintenance of aircraft, often require temporary data transmission associated with these operations. These data transmissions are referred to as on-ground communication, to differentiate from in-flight communication. For example, during manufacturing of an aircraft, assembly information is needed at a particular location inside the fuselage. Installation of a permanent wired communication network is not desirable because of added weight, which is a critical factor for aircraft design and operation. On the other hand, temporary wired networks take time to install and remove and often interfere with movement and operations performed inside the aircraft. Furthermore, wireless networks suffer from poor signal transfer inside the fuselage and through the fuselage, which is often made from signal interfering materials, such as metals and carbon-containing composites.

What is needed are methods and systems for on-ground communication using existing systems of aircraft, such as electrical power distribution systems.

SUMMARY

Provided are methods and systems for on-ground communication using an electrical power distribution system of an aircraft. Specifically, two broadband over power line (BPL) communication modules are communicatively coupled to an electrical power distribution system of an aircraft at different locations. A communication-initiation request is transmitted between these modules and, in some examples, is used to establish communication between the modules. In more specific examples, the receiving module determines received parameters of the communication-initiation request, which depend, at least in part, on characteristics of the electrical power distribution system. The received parameters are compared with expected parameters, and an operating indication of the electrical power distribution system is generated based on this comparison. In some examples, the operating indication is used to verify configuration of the electrical power distribution system (e.g., during aircraft assembly), service requirements (e.g., during aircraft operation), and the like.

Illustrative, non-exclusive examples of inventive features according to present disclosure are described in following enumerated paragraphs:

A1. Method 200 for on-ground communication using electrical power distribution system 110 of aircraft 100, method 200 comprising:

communicatively coupling first BPL communication module 160 to electrical power distribution system 110 at first location 111 of electrical power distribution system 110;

communicatively coupling second BPL communication module 170 to electrical power distribution system 110 at second location 112 of electrical power distribution system 110, different from first location 111;

transmitting communication-initiation request 190 through electrical power distribution system 110 from first BPL communication module 160, communicatively coupled to electrical power distribution system 110 at first location 111, to second BPL communication module 170, communicatively coupled to electrical power distribution system 110 at second location 112;

upon receipt of communication-initiation request 190 at second BPL communication module 170, determining received parameters 178 of communication-initiation request 190 using second BPL communication module 170, wherein received parameters 178 depend at least in part on characteristics 119 of electrical power distribution system 110 between first location 111 and second location 112 while transmitting communication-initiation request 190;

comparing received parameters 178 to expected parameters 176 of electrical power distribution system 110 between first location 111 and second location 112 using second BPL communication module 170; and generating an operating indication 118 of electrical power distribution system 110 between first location 111 and second location 112 while transmitting communication-initiation request 190, wherein operating indication 118 is generated using second BPL communication module 170 based on the comparison of received parameters 178 to expected parameters 176 of electrical power distribution system 110 between first location 111 and second location 112.

A2. Method 200 of paragraph A1, wherein received parameters 178 are at least one of:

identification of a conductor in electrical power distribution system 110, carrying communication-initiation request 190;

transmission of electrical power in conductor in electrical power distribution system 110, carrying communication-initiation request 190;

power loss of communication-initiation request 190;

a data transfer rate of communication-initiation request 190; and signal loss delay of communication-initiation request 190.

A3. Method 200 of any one paragraphs A1-A2, wherein at least one of expected parameters 176 differs for different positions of first location 111 and second location 112 in electrical power distribution system 110.

A4. Method 200 of any one of paragraphs A1-A3, further comprising, prior to communicatively coupling first BPL communication module 160 and second BPL communication module 170 to electrical power distribution system 110, determining at least one of first location 111 or second location 112 in electrical power distribution system 110.

A5. Method 200 of any one of paragraphs A1-A4, wherein at least one of first location 111 or second location 112 is at least one of:

power outlet 115 inside cabin 105 of aircraft 100, a power distribution point, an electronic equipment bay; and an auxiliary power unit (APU) standby power feeder cable.

A6. Method 200 of any one of paragraphs A1-A5, wherein expected parameters 176 of electrical power distribution system 110, between first location 111 and second location 112, are stored in database 174 of second BPL communication module 170.

A7. Method 200 of any one of paragraphs A1-A6, further comprising determining expected parameters 176 at second BPL communication module 170 based on first location 111, second location 112, and electrical diagram 179 of electrical power distribution system 110.

A8. Method 200 of any one of paragraphs A1-A7, further comprising receiving location data, corresponding to first location 111 and second location 112, at second BPL communication module 170.

A9. Method 200 of any one of paragraphs A1-A8, further comprising updating expected parameters 176 characteristics based on received parameters 178.

A10. Method 200 of any one of paragraphs A1-A9, further comprising storing at least one of received parameters 178 or operating indication 118 in database 174 of second BPL communication module 170.

A11. Method 200 of any one of paragraphs A1-A10, further comprising displaying or transmitting at least one of received parameters 178 or operating indication 118 using second BPL communication module 170.

A12. Method 200 of any one of paragraphs A1-A11, wherein generating operating indication 118 comprises assigning different weight factors to individual parameters of received parameters 178.

A13. Method 200 of any one of paragraphs A1-A12, further comprising:

establishing a communication link between first BPL communication module 160, communicatively coupled to electrical power distribution system 110 at first location 111, and second BPL communication module 170, communicatively coupled to electrical power distribution system 110 at second location 112, based on operating indication 118; and transmitting communication data between first BPL communication module 160 and second BPL communication module 170 using communication link.

A14. Method 200 of any one of paragraphs A1-A13, further comprising, while transmitting communication-initiation request 190, transmitting electrical power through at least a portion of electrical power distribution system 110 between first location 111 and second location 112.

A15. Method 200 of any one of paragraphs A1-A14, further comprising determining power transmission performance of electrical power distribution system 110 between first location 111 and second location 112 based on operating indication 118.

A16. Method 200 of any one of paragraphs A1-A15, further comprising repeating at least transmitting communication-initiation request 190, determining received parameters 178 of communication-initiation request 190, comparing received parameters 178 to expected parameters 176, and generating operating indication 118 at least once while first BPL communication module 160 is communicatively coupled to electrical power distribution system 110 at first location 111 and while second BPL communication module 170 is communicatively coupled to electrical power distribution system 110 at second location 112.

A17. Method 200 of any one of paragraphs A1-A16, further comprising:

communicatively coupling second BPL communication module 170 to electrical power distribution system 110 at a third location 113; and repeating at least transmitting communication-initiation request 190, determining received parameters 178 of communication-initiation request 190, comparing received parameters 178 to expected parameters 176, and generating operating indication 118 at least once while first BPL communication module 160 is communicatively coupled to electrical power distribution system 110 at first location 111 and while second BPL communication module 170 is communicatively coupled to electrical power distribution system 110 at third location 113.

A18. Method 200 of any one of paragraphs A1-A17, wherein:

electrical power distribution system 110 of aircraft 100 comprises power cable 117, connecting aircraft 100 to gate 116; and either first location 111 or second location 112 is at gate 116.

A19. Method 200 of any one of paragraphs A1-A18, wherein at least one of communicatively coupling first BPL communication module 160 to electrical power distribution system 110 or communicatively coupling second BPL communication module 170 to electrical power distribution system 110 comprises one of inductive coupling or capacitance coupling.

A20. Method 200 of any one of paragraphs A1-A19, wherein method 200 is performed during fabrication of aircraft 100.

B1. BPL network system 150 for on-ground communication of aircraft 100, BPL network system 150 comprising:

electrical power distribution system 110 of aircraft 100;

first BPL communication module 160, communicatively coupled to electrical power distribution system 110 at first location 111; and second BPL communication module 170, communicatively coupled to electrical power distribution system 110 at second location 112, wherein first BPL communication module 160 is configured to transmit communication-initiation request 190 to second BPL communication module 170; and wherein second BPL communication module 170 is configured to:

determine received parameters 178 of communication-initiation request 190, wherein received parameters 178 depend at least in part on characteristics 119 of electrical power distribution system 110 between first location 111 and second location 112 while transmitting communication-initiation request 190, compare received parameters 178 to expected parameters 176 of electrical power distribution system 110 between first location 111 and second location 112; and generate an operating indication 118 of electrical power distribution system 110 between first location 111 and second location 112 while transmitting communication-initiation request 190, wherein operating indication 118 is generated based on comparison of received parameters 178 to expected parameters 176 of electrical power distribution system 110 between first location 111 and second location 112.

B2. BPL network system 150 of paragraph B1, wherein at least one of first BPL communication module 160 or second BPL communication module 170 is a BPL modem.

B3. BPL network system 150 of any one of paragraphs B1-B2, wherein second BPL communication module 170 comprises database 174, comprising expected parameters 176.

B4. BPL network system 150 of paragraph B3, wherein database 174 is configured to receive and store at least one of received parameters 178 or operating indication 118.

B5. BPL network system 150 of any one of paragraphs B1-B4, wherein second BPL communication module 170 is configured to determine expected parameters 176 based on first location 111, second location 112, and electrical diagram 179 of electrical power distribution system 110.

B6. BPL network system 150 of any one of paragraphs B1-B5, wherein second BPL communication module 170 is configured to display or transmit at least one of received parameters 178 or operating indication 118.

B7. BPL network system 150 of any one of paragraphs B1-B6, wherein second BPL communication module 170 is configured to determine the power transmission performance of electrical power distribution system 110 between first location 111 and second location 112 based on operating indication 118.

B8. BPL network system 150 of any one of paragraphs B1-B7, wherein at least one of first BPL communication module 160 or second BPL communication module 170 is communicatively coupled to electrical power distribution system 110 using one of inductive coupling or capacitance coupling.

DETAILED DESCRIPTION

Figure 1:
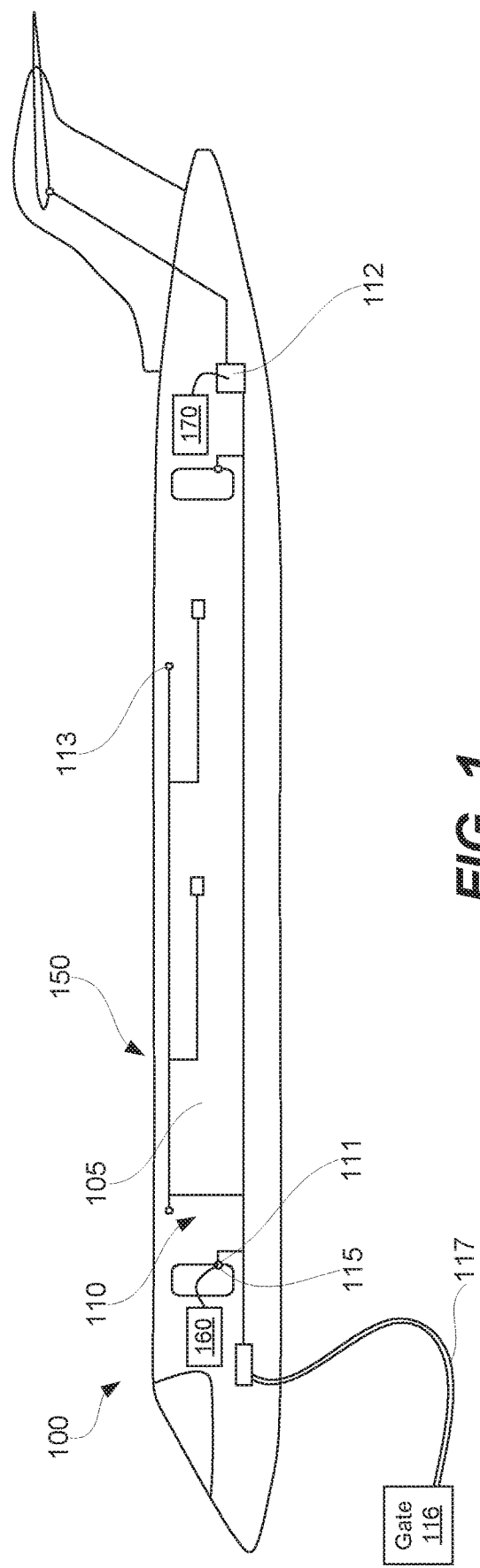
FIG. 1 is a schematic illustration of an aircraft, comprising a broadband over power line (BPL) network system for on-ground communication, in accordance with some examples.

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Establishing temporary communication networks within aircraft during manufacturing, service, and maintenance is challenging. As noted above, permanent wired networks are undesirable due to the added weight, while temporary wired networks take time to install and remove and interfere with mobility and operations performed inside the aircraft. Weight and turnaround time are both critical in aircraft applications. At the same time, fuselage components interfere with transmission of wireless signals inside the fuselage and through the fuselage and typically require special antennas and transmitters.

Another challenge is associated with testing electrical power distribution systems of aircraft, both during fabrication and operation of the aircraft. A typical electrical power distribution system of a modern aircraft contains hundreds of components, wires, relays, branches, circuit breakers and the like. In one example, multiple power sources (e.g., generators) are coupled/synchronized together or isolated to optimize the safety and operation of the aircraft. This results in a large number of permutations given various possible combinations of electrical sources, electrical loads, and connections between these components. With every unique set of electrical loads and sources, the characteristics of the systems change, resulting in an individual electrical signature, which includes capacitive, inductive, resistive, frequency response, and other like characteristics. By leveraging the knowledge of the temporal and permanent characteristics of the electrical system and the present configuration, communication and trending algorithms for the system are optimized.

Testing of the installed system can take a long time, slowing down the production and increasing costs. Furthermore, after aircraft fabrication, most components of the electrical power distribution system are hidden behind panels and other fuselage parts and are not easily accessible. Finally, the electrical power distribution system is subjected to temperature fluctuations, vibration, and other like conditions during operation of aircraft. These conditions stress connections and components of the electrical power distribution system, requiring periodic inspections. At the same time, aircraft operators are interested in minimizing the down time of their aircraft and even the time spent on the ground.

Provided are methods and systems which address various challenges, presented above, by utilizing the electrical power distribution systems of aircraft for on-ground communication. More specifically, an electrical power distribution system is used as a wired communication medium to establish communication links between different locations within the aircraft and, in some examples, outside of the aircraft. The electrical power distribution system is already present in the aircraft; therefore, no additional weight is added. The electrical power distribution system is used during fabrication and/or maintenance of the aircraft. The communication system also includes two or more BPL communication modules, which are temporarily or permanently coupled to the electrical power distribution system at different locations. The communication between these BPL modules is used, for example, to transmit data to a processing location inside the fuselage during aircraft fabrication. Furthermore, this communication or, more specifically, received parameters of communication-initiation requests, represent the current state (e.g., configuration and performance) of the electrical power distribution system. As such, the method is used, in some examples, to test for various performance characteristics during this communication.

BPL Network System Examples

FIG. 1 is a schematic illustration of aircraft 100, comprising electrical power distribution system 110. Various examples of aircraft 100 are within the scope, e.g., passenger aircraft, cargo aircraft, and the line. In some examples, aircraft 100 is being assembled. In other examples, aircraft 100 is being maintained or serviced.

One use of electrical power distribution system 110 is to transmit electrical power within aircraft 100, between various components of aircraft 100, such as fuel pumps, electrical actuators, lights, displays, fans, window heaters, compressors, avionics, and the like. Electrical power distribution system 110 is positioned throughout the fuselage of aircraft 100 and comprises bus bars, wires, electrical components, outlets, circuit breakers, bus tie breakers, bus power control units. Knowledge of the electrical system both the instantaneous-dynamic and non-variable portions (wire runs).

FIG. 1 also illustrates BPL network system 150, which comprises and utilizes electrical power distribution system 110 for on-ground communication and, in some examples, for testing electrical power distribution system 110. BPL network system 150 is part of aircraft 100, at least during execution of the method for on-ground communication, described below. In some examples, parts of BPL network system 150 are removed from aircraft 100, as further described below. In these examples, electrical power distribution system 110 remains on aircraft 100.

BPL network system 150 also comprises first BPL communication module 160 and second BPL communication module 170. During operation of BPL network system 150, first BPL communication module 160 is communicatively coupled to electrical power distribution system 110 at one location (e.g., first location 111). Similarly, second BPL communication module 170 is communicatively coupled to electrical power distribution system 110 at another location (e.g., second location 112). In some examples, the coupling location of first BPL communication module 160 and/or second BPL communication module 170 are changed, e.g., to test different portion of electrical power distribution system 110. Some examples of coupling locations are power outlet 115 (e.g., at a door entry on inside cabin 105), a power distribution point, an electronic equipment bay (EE-Bay), auxiliary power unit (APU) standby power feeder cable (e.g., in at the tail end of aircraft 100 via a removable overhead panel, or mid-ship via an overhead panel or side wall panel), and the like.

In some examples, first BPL communication module 160 and/or second BPL communication module 170 are removable from aircraft 100. In more specific examples, first BPL communication module 160 and/or second BPL communication module 170 are not present on aircraft 100 during flight. Various coupling methods of first BPL communication module 160 and second BPL communication module 170 to electrical power distribution system 110 are within the scope. In one example, at least one first BPL communication module 160 or second BPL communication module 170 is communicatively coupled to electrical power distribution system 110 using a direct electrical connection. In the same or other examples, at least one first BPL communication module 160 or second BPL communication module 170 is communicatively coupled to electrical power distribution system 110 using one of inductive coupling or capacitance coupling.

Figure 2:
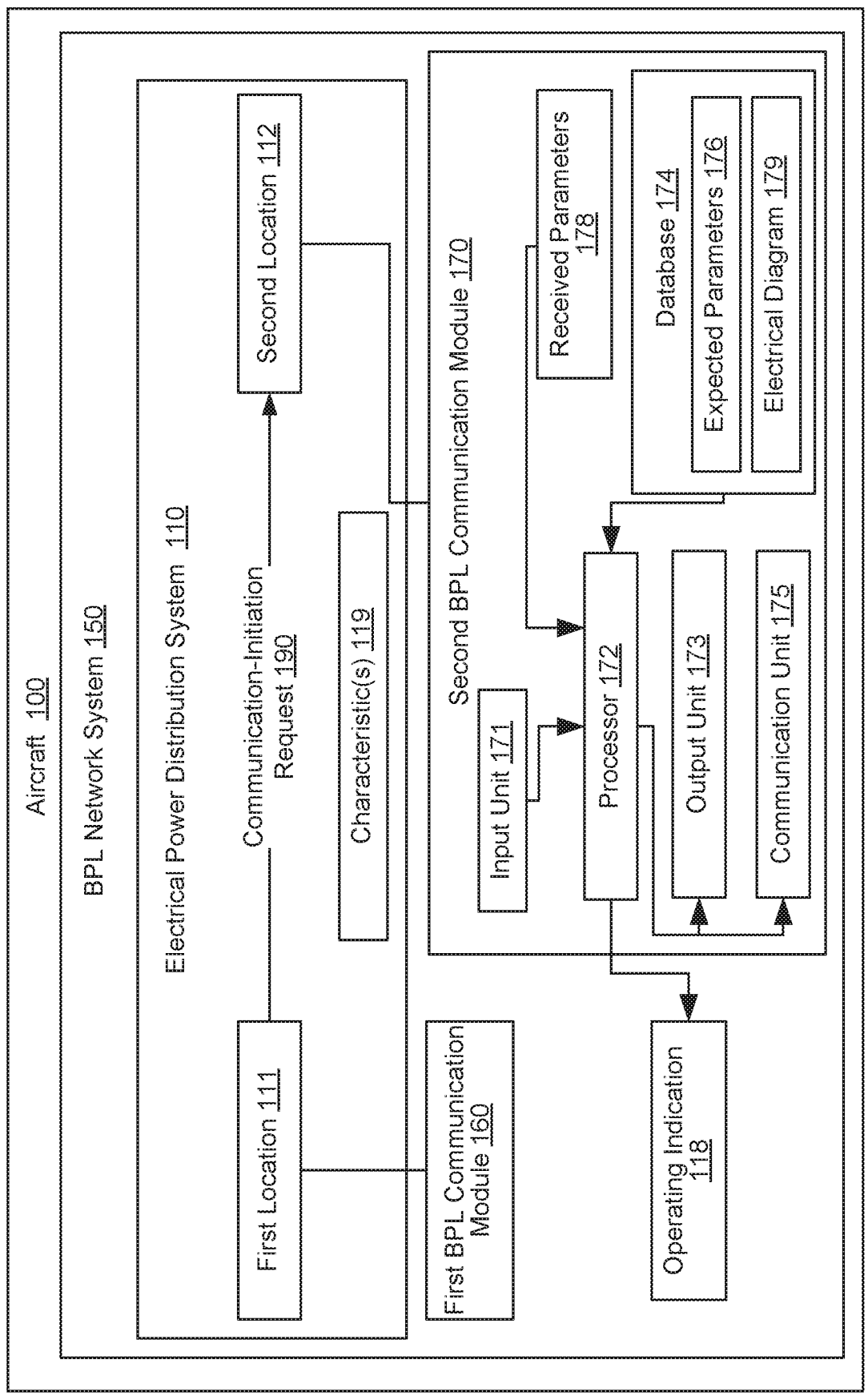
FIG. 2 is a schematic block diagram of the BPL network system for on-ground communication, in accordance with some examples.

Referring to FIG. 2, first BPL communication module 160 is configured to transmit communication-initiation request 190 to second BPL communication module 170. Second BPL communication module 170 is configured to determine received parameters 178 of communication-initiation request 190. As further described below, received parameters 178 depend at least in part on characteristics 119 of electrical power distribution system 110 between first location 111 and second location 112 at the time of transmitting communication-initiation request 190.

Second BPL communication module 170 is also configured to compare received parameters 178 to expected parameters 176 of electrical power distribution system 110 between first location 111 and second location 112. Furthermore, second BPL communication module 170 is configured to generate operating indication 118 of electrical power distribution system 110 between first location 111 and second location 112. Operating indication 118 represents the state of electrical power distribution system 110 at the time of transmitting communication-initiation request 190. For example, operating indication 118 is generated by second BPL communication module 170 based on comparison of received parameters 178 to expected parameters 176 of electrical power distribution system 110 between first location 111 and second location 112. As such, second BPL communication module 170 is referred to as a master module, while first BPL communication module 160 is referred to as a slave module.

In some examples, second BPL communication module 170 comprises database 174, comprising or, more specifically, storing expected parameters 176. Furthermore, in some examples, database 174 is configured to receive and store at least one of received parameters 178 or operating indication 118. Received parameters 178 and/or operating indications 118 are collected over time and, in some examples, are used to determine performance trends. Furthermore, in some examples, database 174 comprises electrical diagram 179 of electrical power distribution system 110.

In some examples, second BPL communication module 170 is configured to determine expected parameters 176 based on first location 111, second location 112, and electrical diagram 179 of electrical power distribution system 110. For example, referring to FIG. 2, second BPL communication module 170 comprises processor 172, configured to perform this operation. More specifically, processor 172 receives electrical diagram 179 from database 174 of second BPL communication module 170. First location 111 and second location 112 are provided as an input, for example, by a user, into input module 171 of second BPL communication module 170. Processor 172 identifies a corresponding first location 111 and second location 112 in electrical diagram 179 and determines, from electrical diagram 179, all components of electrical power distribution system 110 positioned between first location 111 and second location 112 through which communication-initiation request 190 passes. In some examples, second BPL communication module 170 or, more specifically, processor 172, is configured to determine the power transmission performance of electrical power distribution system 110 between first location 111 and second location 112 based on operating indication 118.

In some examples, second BPL communication module 170 is configured to display or transmit at least one of received parameters 178 or operating indication 118. Referring to an example in FIG. 2, in some examples, second BPL communication module 170 comprises output unit 173, such as a display. Output unit 173 is configured to display or otherwise present at least one of received parameters 178 or operating indication 118 to a user. Output unit 173 is also configured to present information transmitted through BPL network system 150 (e.g., aircraft assembly information).

Furthermore, referring to an example in FIG. 2, second BPL communication module 170 comprises communication unit 175, such as an Ethernet card, wireless transmitter, or the like, configured to transmit at least one of received parameters 178 or operating indication 118 to an external system. For example, data associated with performance of electrical power distribution system across an aircraft fleet is collected by an aircraft manufacturer, airline, service provider, or any other entity and later analyzed for various trends. In some examples, these trends include peak data rate, voltage, current, temperature, power factor, and noise profiles.

In some examples, first BPL communication module 160 or second BPL communication module 170 are identified and/or addressed by a hardware identifier such as a media access control (MAC) address. For example, the BPL transmission protocol follows one of the established or developing standards, such as Institute of Electrical and Electronics Engineers (IEEE) standard 1901 or ITU-T's G.hn specification. One or two of the following physical layers are used in a protocol (e.g., a fast Fourier transform orthogonal frequency-division multiplexing modulation layer, and a wavelet orthogonal frequency-division multiplexing modulation layer). A first one of these layers includes a forward error correction scheme based on a convolutional turbo code. A second one of these layers includes a mandatory forward error correction based on a concatenated Reed-Solomon and convolutional code. In some examples, MAC layers are defined on top of these two physical layers. For example, one MAC layer is used for local networking, while another is used for access networking. To manage coexistence of multiple physical layers and MAC layers, an inter-system protocol is used in some examples. This protocol is used so that first BPL communication module 160 or second BPL communication module 170 are able to utilize and/or share various communication resources, such as frequency/time, when installed a common electrical wiring is used in Orthogonal Frequency Division Multiplexed (OFDM) and Time Division Multiple Access (TDMA) modulation schemes.

Referring to FIG. 1, in some examples, electrical power distribution system 110 of aircraft 100 also comprises power cable 117 connecting aircraft 100 to gate 116 and providing electrical power to aircraft 100. In more specific examples, first BPL communication module 160 or second BPL communication module 170 are positioned at gate 116 and communicatively coupled to power cable 117. In some examples, gate 116 is equipped with a solid state converter to convert this incoming alternating current (AC) into 400 Hz AC to be supplied to aircraft 100. A data signal cannot propagate through a converter unless a data repeater is provided. Unlike airwaves used for Wi-Fi and cellular communication that propagate through public areas at airport and beyond airport limits, access to 400 Hz AC lines or other like lines is restricted, which adds to the physical security of BPL data transfer.

On-Ground Communication Examples

Figure 3:
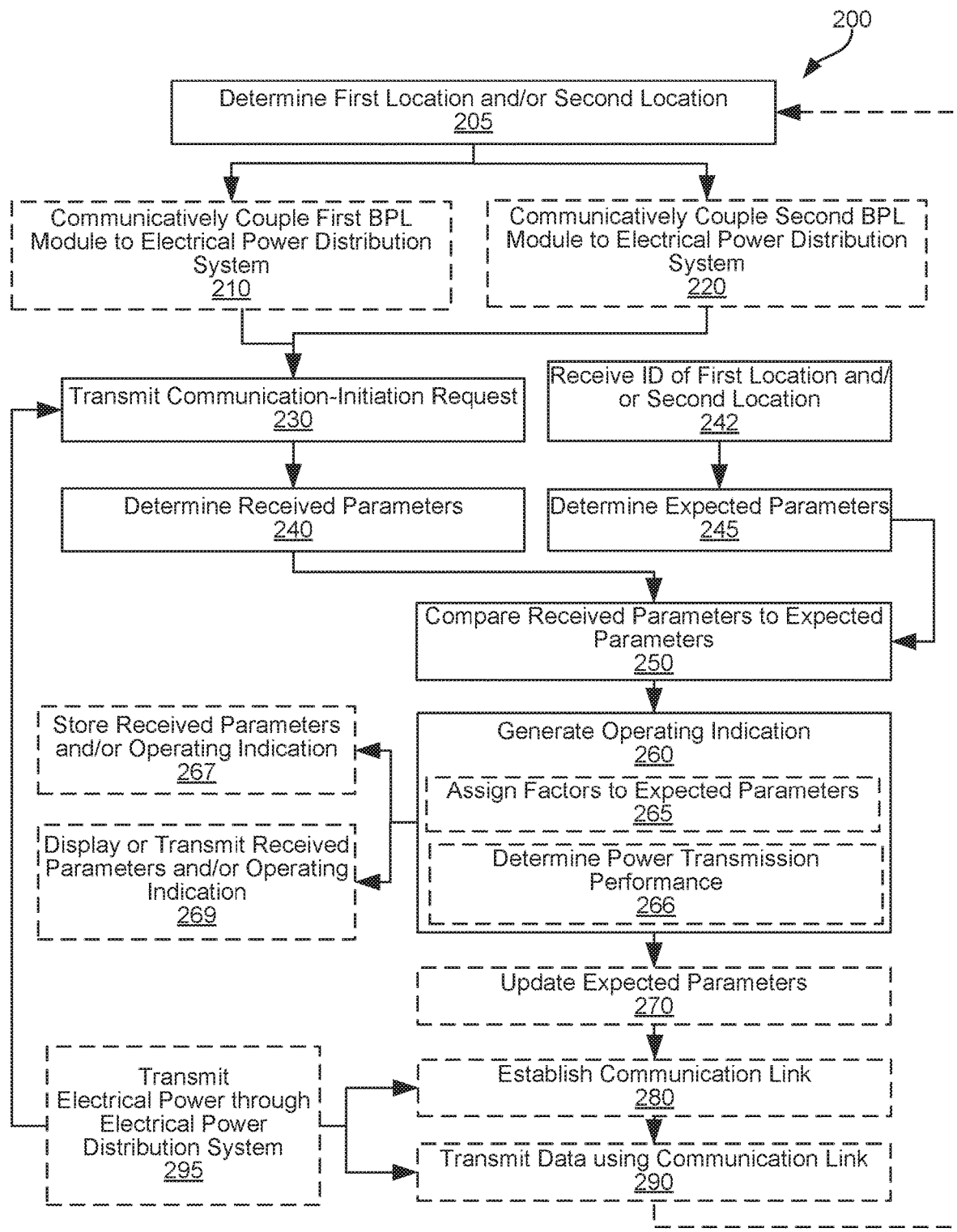
FIG. 3 is a process flowchart corresponding to a method for on-ground communication using the BPL network system, in accordance with some examples.

FIG. 3 is a process flowchart corresponding to method 200 for on-ground communication using electrical power distribution system 110 of aircraft 100, in accordance with come embodiments. Electrical power distribution system 110 is a part of BPL network system 150, which is described above with reference to FIGS. 1 and 2. In addition to electrical power distribution system 110, BPL network system 150 also comprises other components, such as first BPL communication module 160 and second BPL communication module 170.

In some examples, method 200 comprises determining at least one of first location 111 or second location 112 in electrical power distribution system 110 (block 205). Some examples of first location 111 and second location 112 are described above. In more examples, first location 111 and/or second location 112 are determined based on specific goals of method 200 (e.g., to transmit data to a specific location in aircraft 100, to test a specific portion of electrical power distribution system 110, and the like). First location 111 and second location 112 also depend on accessibility of electrical power distribution system 110 at these locations or, more specifically, on an ability to form communicative coupling to electrical power distribution system 110 at these locations.

Method 200 optionally comprises communicatively coupling first BPL communication module 160 to electrical power distribution system 110 at first location 111 of electrical power distribution system 110 (block 210). Furthermore, method 200 optionally comprises communicatively coupling second BPL communication module 170 to electrical power distribution system 110 at second location 112 of electrical power distribution system 110 (block 220). In some examples, first BPL communication module 160 and/or second BPL communication module 170 are coupled to electrical power distribution system 110, e.g., as a part of a different process (fabricating or configuring aircraft 100).

In some examples, communicative coupling is achieved by direct coupling of electrically conductive components (e.g., wires) of electrical power distribution system 110 and that of first BPL communication module 160 and second BPL communication module 170. Alternatively, communicative coupling is achieved by inductive coupling or capacitance coupling.

Method 200 comprises transmitting communication-initiation request 190 through electrical power distribution system 110 from first BPL communication module 160 to second BPL communication module 170 (block 230). During this operation, first BPL communication module 160 is communicatively coupled to electrical power distribution system 110 at first location 111, while second BPL communication module 170 is communicatively coupled to electrical power distribution system 110 at second location 112.

Figure 4:
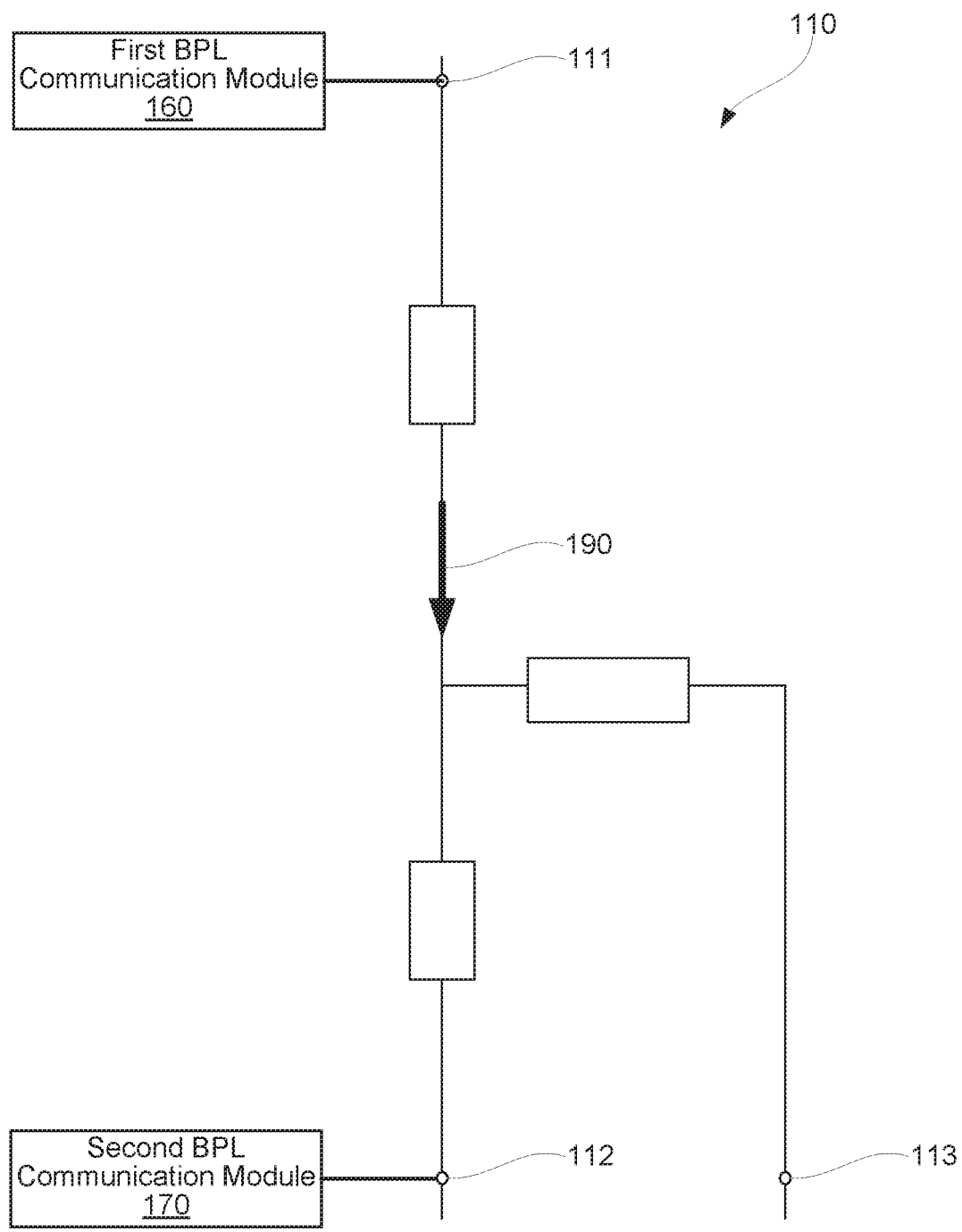
FIG. 4 is a schematic illustration of various features of the method for on-ground communication using the BPL network system, in accordance with some examples.

FIG. 4 is a schematic illustration of communication-initiation request 190 travelling through electrical power distribution system 110 from first location 111 to second location 112. Properties of communication-initiation request 190 received at second location 112 depend on characteristics of electrical power distribution system 110 between first location 111 and second location 112.

In some example, communication-initiation request 190, transmitted from first BPL communication module 160, is a specific data packet, which is known to second BPL communication module 170. For example, a data packet is specifically designed to test various features of electrical power distribution system 110 between first location 111 and second location 112. In some examples, during this operation, which may be also referred to as the initiation "handshake", the signals peak voltage, rise time, number of retries, time stamp, are monitored and used to determine various characteristics of electrical power distribution system 110 (e.g., status and health). More specifically, these characteristics are monitored in an acknowledge response, thereby observing the symmetry. Any differences in the characteristics of this symmetrical approach provide additional information and used for troubleshooting, trending and prognostication.

Method 200 comprises determining received parameters 178 of communication-initiation request 190 (block 240). This operation is performed using second BPL communication module 170 and upon receipt of communication-initiation request 190 at second BPL communication module 170. Received parameters 178 depend on characteristics 119 of electrical power distribution system 110 between first location 111 and second location 112 at the time of transmitting communication-initiation request 190.

Some examples of received parameters 178 are (a) identification of a conductor carrying communication-initiation request 190, (b) transmission of electrical power in a conductor carrying communication-initiation request 190, (c) power loss of communication-initiation request 190, (d) data transfer rate of communication-initiation request 190, and (e) signal loss delay of communication-initiation request 190. Other examples include the signals peak voltage, rise time, number of retries, time stamp, and the like.

For example, first BPL communication module 160 is communicatively coupled to multiple wires in a first wire harness extending through first location 111. Similarly, second BPL communication module 170 is communicatively coupled to multiple wires in a second wire harness extending through second location 112. In this example, communication-initiation request 190 may be sent through a first wire of the first wire harness and is received in a corresponding wire of the second wire harness or a wire of the second wire harness that is electrically connected to the first wire of the first wire harness. This approach is used to establish correspondence and identify conductors. Furthermore, in some examples, multiple communication-initiation requests are transmitted using different wires in a first wire harness for benchmark testing.

In some examples, method 200 further comprises receiving, at second BPL communication module 170, identification of first location 111 and second location 112 in electrical power distribution system 110 (block 242). For example, an operator enters this identification using input unit 171 of second BPL communication module 170. Alternatively, at least one of first location 111 and second location 112 is identified automatically based on various features of communication-initiation request 190 received at second BPL communication module 170 or other characteristics detected by second BPL communication module 170.

In some examples, method 200 further comprises determining one or more expected parameters 176 at second BPL communication module 170 (block 245). Specifically, expected parameters 176 are determined based on first location 111, second location 112, and electrical diagram 179 of electrical power distribution system 110. As described above, in some examples, electrical diagram 179 is available in database 174 of second BPL communication module 170.

Method 200 further comprises comparing received parameters 178 to expected parameters 176 of electrical power distribution system 110 between first location 111 and second location 112 (block 250). This operation is performed using second BPL communication module 170. In some examples, at least one of received parameters 178 and a corresponding one of expected parameters 176 depend on positions of first location 111 and second location 112 in electrical power distribution system 110. For example, length of a conductor between first location 111 and second location 112 has an impact on power and signal losses as well as data transfer rates. Furthermore, electrical power distribution system 110 includes various components, such as circuit breakers, disconnects, bus tie breakers, relays, shielding, and the like. In some examples, transmission of communication-initiation request 190 is influenced by one or more of these components being present on the path of communication-initiation request 190. Depending on location of first location 111 and second location 112, one or more of these components are present between first location 111 and second location 112.

In some examples, expected parameters 176 of electrical power distribution system 110, between first location 111 and second location 112, are stored in database 174 of second BPL communication module 170. For example, database 174 includes multiple location options of electrical power distribution system 110. Each pair of location options has a corresponding set of expected parameters 176. In some examples, these sets of expected parameters 176 are derived using prior tests of electrical power distribution system 110 (e.g., historical performance) or a different electrical power distribution system (e.g., a reference system) or signal modeling (e.g., based on a schematic representing electrical power distribution system 110).

Method 200 comprises generating operating indication 118 of electrical power distribution system 110 between first location 111 and second location 112 (block 260). Operating indication 118, generated during this operation, corresponds to the time when communication-initiation request 190 was transmitted. Furthermore, operating indication 118 is generated based on comparison of received parameters 178 to expected parameters 176 of electrical power distribution system 110 between first location 111 and second location 112.

In some examples, generating operating indication 118 (block 260) comprises assigning different weight factors to individual parameters of received parameters 178 (block 265). For example, some of received parameters 178 are more important than others and, therefore, are assigned high weights. As such, in some examples, generating operating indication 118 comprises generating an aggregate score based on these weights and received parameters 178.

In some examples, generating operating indication 118 (block 260) comprises determining power transmission performance of electrical power distribution system 110 (block 266). In more specific examples, operating indication 118 is presented on a user interface (e.g., as flashing lights) on a BPL communication module (e.g., when the module sees unexpected changes in voltages, rise times, temperature, power factor, and the like).

In some examples, method 200 further comprises storing at least one of received parameters 178 or operating indication 118 (block 267). For example, received parameters 178 and/or operating indication 118 are stored in database 174 of second BPL communication module 170. This information is aggregated to perform trending analysis (e.g., to trend the state and performance of electrical power distribution system 110 during operation of aircraft 100).

In some examples, method 200 further comprises displaying or transmitting at least one of received parameters 178 or operating indication 118 (block 269). This operation is performed using second BPL communication module 170. In these examples, further analysis of received parameters 178 and/or operating indication 118 is performed remotely (e.g., across a fleet by an aircraft manufacturer, service provider, or an airline).

In some examples, method 200 further comprises updating expected parameters 176 based on received parameters 178 (block 270). For example, expected parameters 176 are replaced with received parameters 178 averaged together or otherwise integrated. Specifically, received parameters 178 correspond to the current state of electrical power distribution system 110 between first location 111 and second location 112. In some examples, electrical power distribution system 110 is modified (e.g., one or more components added or removed and a previous version of expected parameters 176 is not representative of this change).

In some examples, method 200 further comprises establishing a communication link between first BPL communication module 160 and second BPL communication module 170 (block 280). A communication link is established based on operating indication 118 and while first BPL communication module 160 is communicatively coupled to electrical power distribution system 110 at first location 111, and also while second BPL communication module 170 is communicatively coupled to electrical power distribution system 110 at second location 112. Method 200 further comprises transmitting data between first BPL communication module 160 and second BPL communication module 170 using a communication link (block 290).

The communication link is referred to as a BPL link and, in some examples, is created by impressing a modulated carrier signal on a portion of electrical power distribution system 110. In some examples, different frequency bands are used depending on transmission distance (e.g., distance between first location 111 and second location 112 based on electrical diagram 179) and data rate requirements. Some examples of frequency ranges are between about 1 kHz and 100 MHz or more specifically between 2 MHz and 50 MHz. Because the electric current used to power aircraft 100 and the electrical current used for data transmission use different frequencies, two currents do not interfere with each other. In some examples, data transfer rates are at least about 15 Mbit per second or, more specifically, at least about 65 Mbit per second. In some embodiments, data transfer rates are between about 30 Mbit per second and 300 Mbit per second.

In some examples, method 200 further comprises transmitting electrical power through at least a portion of electrical power distribution system 110 between first location 111 and second location 112 (block 295). More specifically, the electrical power is transmitted while transmitting communication-initiation request 190 (block 230). Furthermore, in some examples, the electrical power is transmitted while establishing communication link (block 280) and transmitting data (block 290). In some examples, the electrical power transmitted by electrical power distribution system 110 is AC at 110V/400 Hz.

In some examples, operations corresponding to various blocks, starting with block 210 and through block 295 are repeated with first BPL communication module 160 and/or second BPL communication module 170 coupled to different locations of electrical power distribution system 110. For example, method 200 comprises communicatively coupling second BPL communication module 170 to electrical power distribution system 110 at third location 113, different from second location 112. Method 200 then proceeds with transmitting an additional communication-initiation request through electrical power distribution system 110 from first BPL communication module 160 to second BPL communication module 170, determining additional received parameters based on this transmission, and generating an additional operation indication. It should be noted that, in some examples, additional received parameters are different from received parameters 178, when second BPL communication module 170 is coupled to electrical power distribution system 110 at second location 112. Furthermore, since third location 113 is different from second location 112, a different portion of electrical power distribution system 110 is tested during these repeated operations.

In some examples, method 200 is performed during fabrication of aircraft 100. Alternatively, method 200 is performed during service of aircraft 100. Both of these aspects are described below with reference to FIGS. 8 and 9.

Computer System Examples

Figure 5:
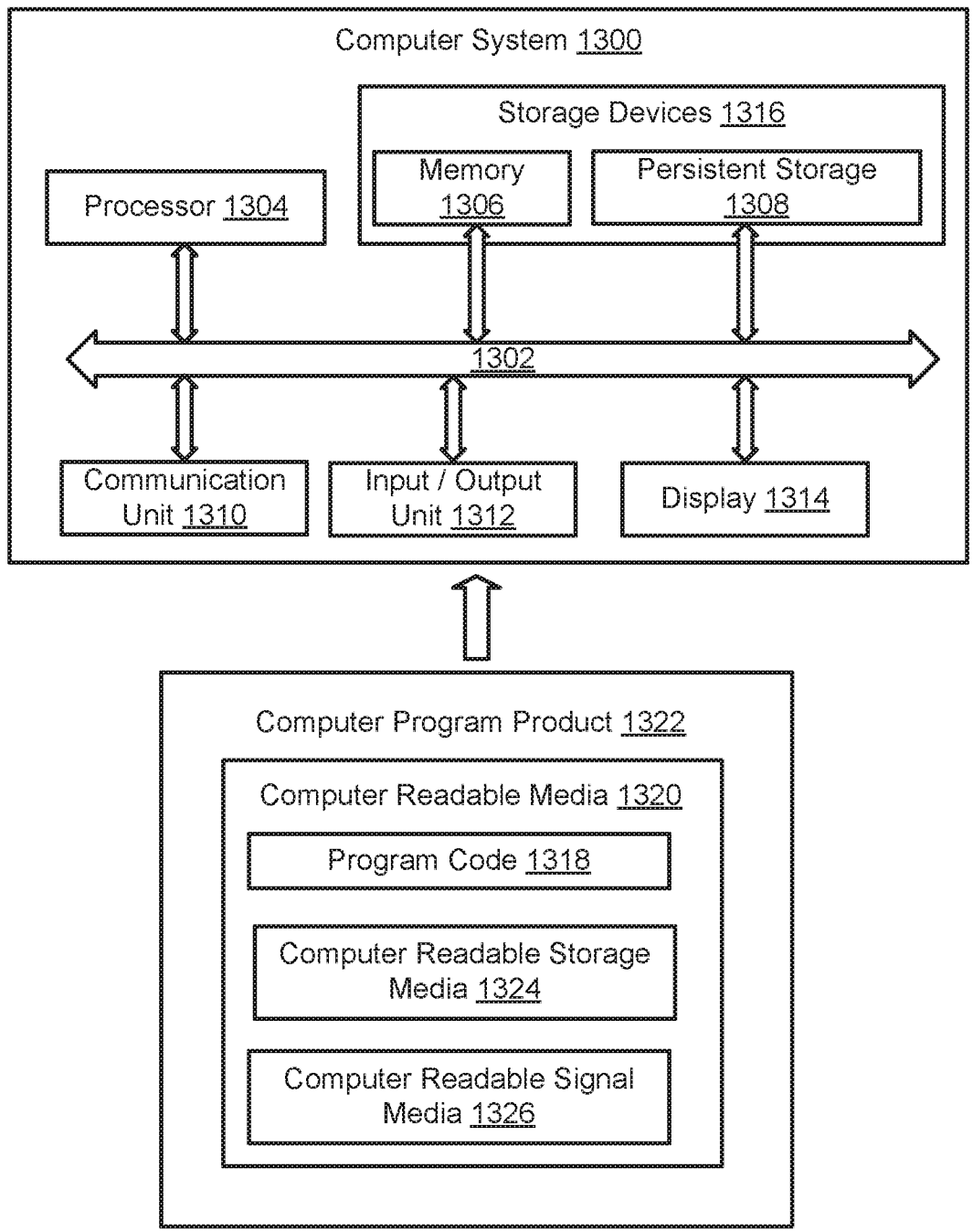
FIG. 5 illustrates a computer system, configured in accordance with some examples to perform as one or more components of the BPL network system of FIG. 2 for on-ground communication in an aircraft.

FIG. 5 illustrates computer system 1300 and computer program product 1322, configured in accordance with some examples. Various components of BPL network system 150, described above, are implementable as and supportable by components of computer system 1300 and computer program product 1322.

In various examples, computer system 1300 includes communications framework 1302, which provides communications between processor unit 1304, memory 1306, persistent storage 1308, communication unit 1310, input/output unit 1312, and display 1314. In this example, communications framework 1302 takes form of a bus system.

Processor unit 1304 serves to execute instructions for software that is loaded into memory 1306. Memory 1306 and persistent storage 1308 are examples of storage devices 1316. A storage device is any piece of hardware capable of storing information, such as, for example, without limitation, data, program code in functional form, and/or other suitable information either on a temporary basis and/or a permanent basis. Storage devices 1316 are also referred to as computer readable storage devices in these illustrative examples. Memory 1306, in these examples, is a random access memory or any other suitable volatile or non-volatile storage device. Persistent storage 1308 takes various forms, depending on implementation. For example, persistent storage 1308 may be a hard drive, a flash memory, a rewritable optical disk, a rewritable magnetic tape, or some combination of above. Media used by persistent storage 1308 is removable, in some examples.

Communications unit 1310, in these illustrative examples, provides for communications with other computer systems or devices. In these illustrative examples, communications unit 1310 is a network interface card, universal serial bus (USB) interface, or other suitable communications device/interface.

Input/output unit 1312 allows for input and output of data with other devices that are connected to computer system 1300. For example, input/output unit 1312 provides a connection for user input through a keyboard, a mouse, and/or some other suitable input device. Further, input/output unit 1312 sends output to a printer. Display 1314 provides a mechanism to display information to a user.

In some examples, instructions for an operating system, applications, and/or programs are located in storage devices 1316, which are in communication with processor unit 1304 through communications framework 1302. Processes of different examples are performed by processor unit 1304 using computer-implemented instructions, which are located in a memory, such as memory 1306.

These instructions are referred to as program code, computer usable program code, or computer readable program code that is read and executed by a processor in processor unit 1304. Program code in different examples is embodied on different physical or computer readable storage media, such as memory 1306 or persistent storage 1308.

Program code 1318 is located in a functional form on computer readable media 1320 that is selectively removable and is loaded onto or transferred to computer system 1300 for execution by processor unit 1304. Program code 1318 and computer readable media 1320 form computer program product 1322 in these illustrative examples. In one example, computer readable media 1320 is or includes computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 is transferred to computer system 1300 using computer readable signal media 1326. Computer readable signal media 1326 is, for example, a propagated data signal containing program code 1318. For example, computer readable signal media 1326 is an electromagnetic signal, an optical signal, and/or any other suitable type of signal. These signals are transmitted over communications links, such as wireless communications links, optical fiber cable, coaxial cable, a wire, and/or any other suitable type of communications link.

The different components illustrated for computer system 1300 are not meant to provide architectural limitations to manner in which different examples are implemented. Different illustrative examples are implemented in a computer system including components in addition to and/or in place of those illustrated for computer system 1300. Other components shown in FIG. 5 can be varied from illustrative examples shown.

Aircraft and Spacecraft Examples

Figure 6:
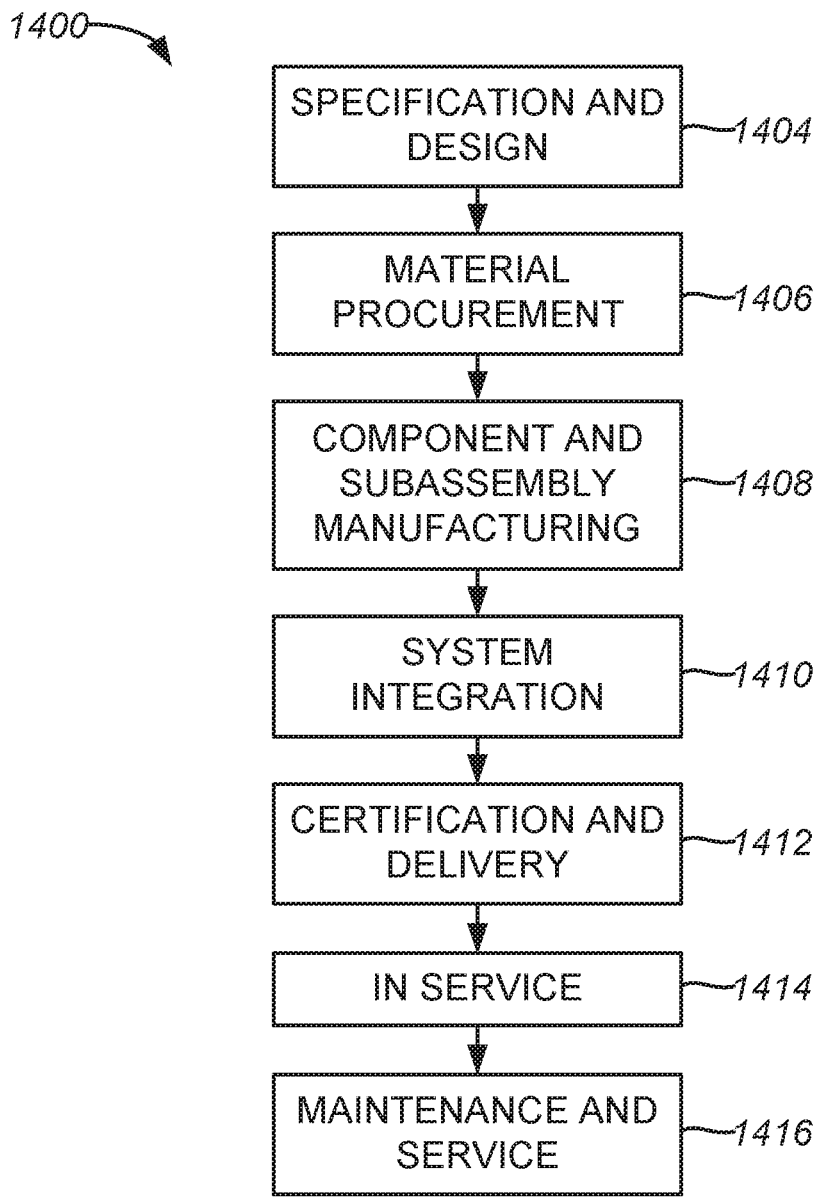
FIG. 6 is a process flowchart corresponding to a method for manufacturing and servicing the aircraft, comprising the BPL network system.

As discussed above, various examples of BPL network system 150 disclosed herein are used on aircraft 100. During pre-production, illustrative method 1400, shown in FIG. 6, includes specification and design 1404 of aircraft 100 and material procurement 1406. During production, component and subassembly manufacturing stage 1408 and system integration stage 1410 of aircraft 100 take place. Thereafter, in some examples, aircraft 100 goes through certification and delivery 1412 in order to be placed in service 1414. While in service by a customer, aircraft 100 is scheduled for routine maintenance and service 1416 (which also includes modification, reconfiguration, refurbishment, and the like).

In some examples, each of the processes of method 1400 is performed or carried out by a system integrator, a third party, and/or an operator (e.g., a customer). For purposes of this description, a system integrator includes without limitation any number of aircraft manufacturers and major-system subcontractors; a third party includes without limitation any number of vendors, subcontractors, and suppliers; and an operator is an airline, leasing company, military entity, service organization, and so on.

Figure 7:
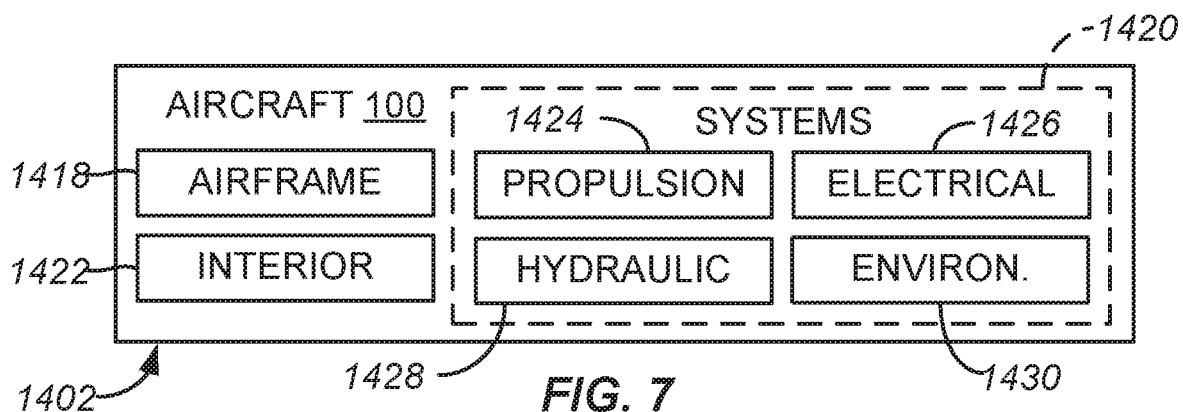
FIG. 7 illustrates a block diagram of an example of an aircraft comprising the BPL network system, in accordance with some examples.

As shown in FIG. 7, aircraft 100 produced by illustrative method 1400 includes airframe 1418 with plurality of systems 1420 and interior 1422, which includes cabin 105, schematically shown in FIG. 1. Examples of high-level systems 1420 include of propulsion system 1424, electrical system 1426, hydraulic system 1428, and environmental system 1430.

Devices and methods embodied herein are employed during any of the stages of method 1400. For example, components or subassemblies corresponding to stages 1408 and 1410 are fabricated or manufactured in a manner similar to components or subassemblies produced while aircraft 100 is in service. Also, in some examples, device examples, method examples, or a combination thereof are utilized during stages 1408 and 1410, for example, by substantially expediting assembly of or reducing cost of an aircraft 1402. Similarly, various features describes above may be utilized while aircraft 100 is in service, for example and without limitation, to maintenance and service 1416.

CONCLUSION

Although foregoing concepts have been described in some detail for purposes of clarity of understanding, it will be apparent that certain changes and modifications may be practiced within scope of appended claims. It should be noted that there are many alternative ways of implementing processes, systems, and apparatus. Accordingly, present examples are to be considered as illustrative and not restrictive.

What is claimed is:

1. A method for on-ground communication using an electrical power distribution system of an aircraft, the method comprising:

communicatively coupling a first broadband over power line (BPL) communication module to the electrical power distribution system at a first location of the electrical power distribution system;

communicatively coupling a second BPL communication module to the electrical power distribution system at a second location of the electrical power distribution system, different from the first location;

transmitting a communication-initiation request through the electrical power distribution system from the first BPL communication module, communicatively coupled to the electrical power distribution system at the first location, to the second BPL communication module, communicatively coupled to the electrical power distribution system at the second location;

upon receipt of the communication-initiation request at the second BPL communication module, determining received parameters of the communication-initiation request using the second BPL communication module, wherein the received parameters depend at least in part on characteristics of the electrical power distribution system between the first location and the second location while transmitting the communication-initiation request;

comparing the received parameters to expected parameters of the electrical power distribution system between the first location and the second location using the second BPL communication module; and generating an operating indication of the electrical power distribution system between the first location and the second location while transmitting the communication-initiation request, wherein the operating indication is generated using the second BPL communication module based on comparison of the received parameters to expected parameters of the electrical power distribution system between the first location and the second location.

2. The method of claim 1, wherein the received parameters are at least, one of:

identification of a conductor in the electrical power distribution system, carrying the communication-initiation request;

transmission of electrical power in the conductor in the electrical power distribution system, carrying the communication-initiation request;

power loss of the communication-initiation request;

a data transfer rate of the communication-initiation request and signal loss delay of the communication-initiation request.

3. The method of claim 1, wherein at least one of the expected parameters differs for different positions of the first location and the second location in the electrical power distribution system.

4. The method of claim 1, further comprising, prior to communicatively coupling the first BPL communication module and the second BPL communication module to the electrical power distribution system, determining at least one of the first location or the second location in the electrical power distribution system.

5. The method of claim 1, wherein at least one of the first location or the second location is one of:

a power outlet inside a cabin of the aircraft, a power distribution point, an electronic equipment bay; and auxiliary power unit (APU) standby power feeder cable.

6. The method of claim 1, wherein the expected parameters of the electrical power distribution system, between the first location and the second location, are stored in a database of the second BPL communication module.

7. The method of claim 1, further comprising determining the expected parameters at the second BPL communication module based on the first location, the second location, and an electrical diagram of the electrical power distribution system.

8. The method of claim 1, further comprising receiving location data, corresponding to the first location and the second location, at the second BPL communication module.

9. The method of claim 1, further comprising updating the expected parameters characteristics based on the received parameters.

10. The method of claim 1, further comprising storing at least one of the received parameters or operating indication in a database of the second BPL communication module.

11. The method of claim 1, further comprising displaying or transmitting at least one of the received parameters or operating indication using the second BPL communication module.

12. The method of claim 1, wherein generating the operating indication comprises assigning different weight factors to individual parameters of the received parameters.

13. The method of claim 1, further comprising:
establishing a communication link between the first BPL communication module, communicatively coupled to the electrical power distribution system at the first location, and the second BPL communication module, communicatively coupled to the electrical power distribution system at the second location, based on the operating indication; and
transmitting communication data between the first BPL communication module and the second BPL communication module using the communication link.

14. The method of claim 1, further comprising, while transmitting the communication-initiation request, transmitting electrical power through at least a portion of the electrical power distribution system between the first location and the second location.

15. The method of claim 1, further comprising determining power transmission performance of the electrical power distribution system between the first location and the second location based on the operating indication.

16. The method of claim 1, further comprising repeating at least transmitting the communication-initiation request, determining received parameters of the communication-initiation request, comparing the received parameters to the expected parameters, and generating the operating indication at least once while the first BPL communication module is communicatively coupled to the electrical power distribution system at the first location and while the second BPL communication module is communicatively coupled to the electrical power distribution system at the second location.

17. The method of claim 1, wherein:
the electrical power distribution system of the aircraft comprises a power cable, connecting the aircraft to a gate; and
either the first location or the second location is at the gate.

18. The method of claim 1, wherein at least one of communicatively coupling the first BPL communication module to the electrical power distribution system or communicatively coupling the second BPL communication module to the electrical power distribution system comprises one of inductive coupling or capacitance coupling.

19. The method of claim 1, wherein the method is performed during fabrication of the aircraft.

20. A broadband over power line (BPL) network system for on-ground communication of an aircraft, the BPL network system comprising:
an electrical power distribution system of the aircraft;
a first BPL communication module, communicatively coupled to the electrical power distribution system at a first location; and
a second BPL communication module, communicatively coupled to the electrical power distribution system at a second location,
wherein the first BPL communication module is configured to transmit a communication-initiation request to the second BPL communication module; and
wherein the second BPL communication module is configured to:
determine received parameters of the communication-initiation request, wherein the received parameters depend at least in part on characteristics of the electrical power distribution system between the first location and the second location while transmitting the communication-initiation request,
compare the received parameters to expected parameters of the electrical power distribution system between the first location and the second location; and
generate an operating indication of the electrical power distribution system between the first location and the second location while transmitting the communication-initiation request, wherein the operating indication is generated based on comparison of the received parameters to expected parameters of the electrical power distribution system between the first location and the second location.

* * * * *